United States Patent Office 3,814,634
Patented June 4, 1974

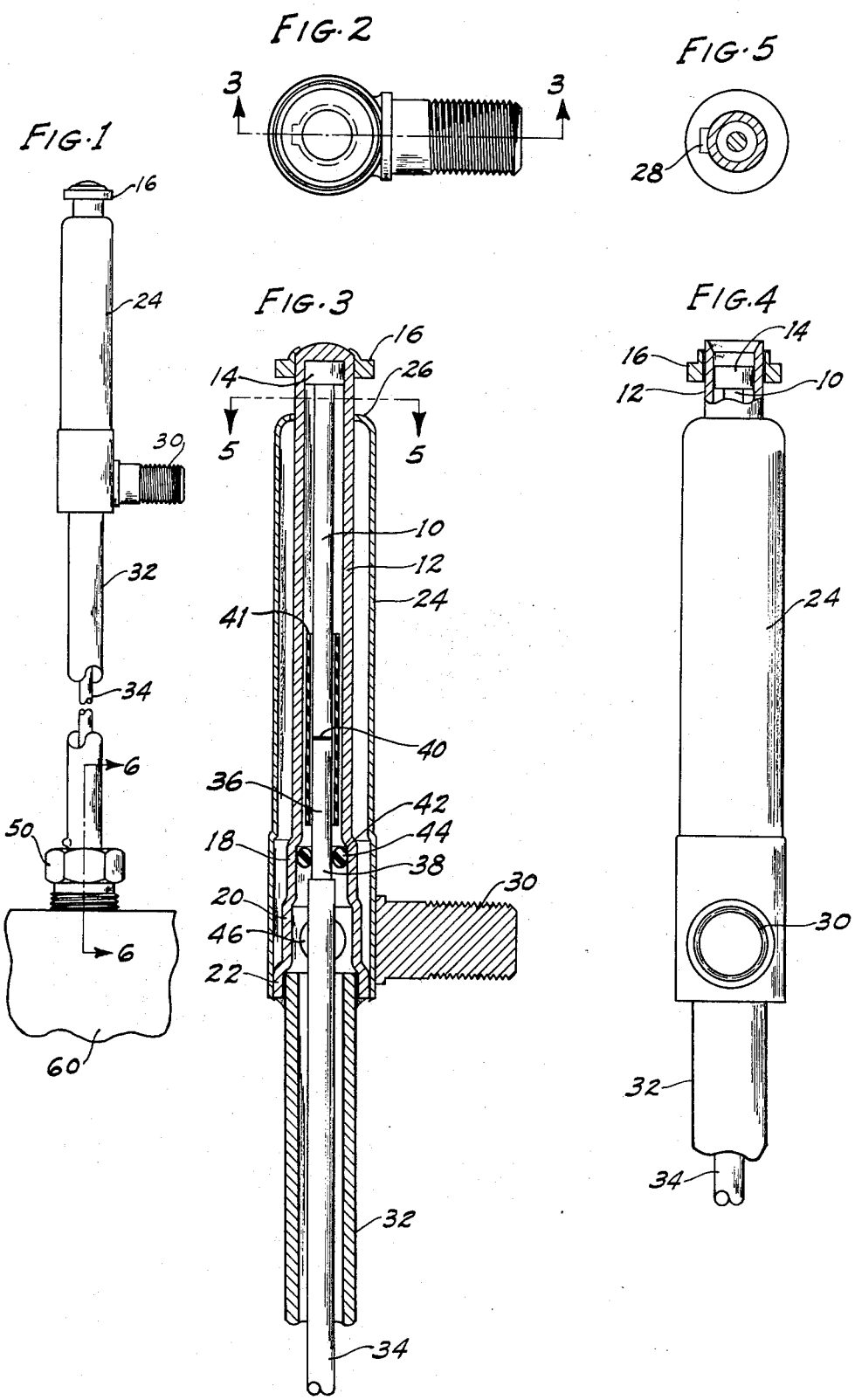

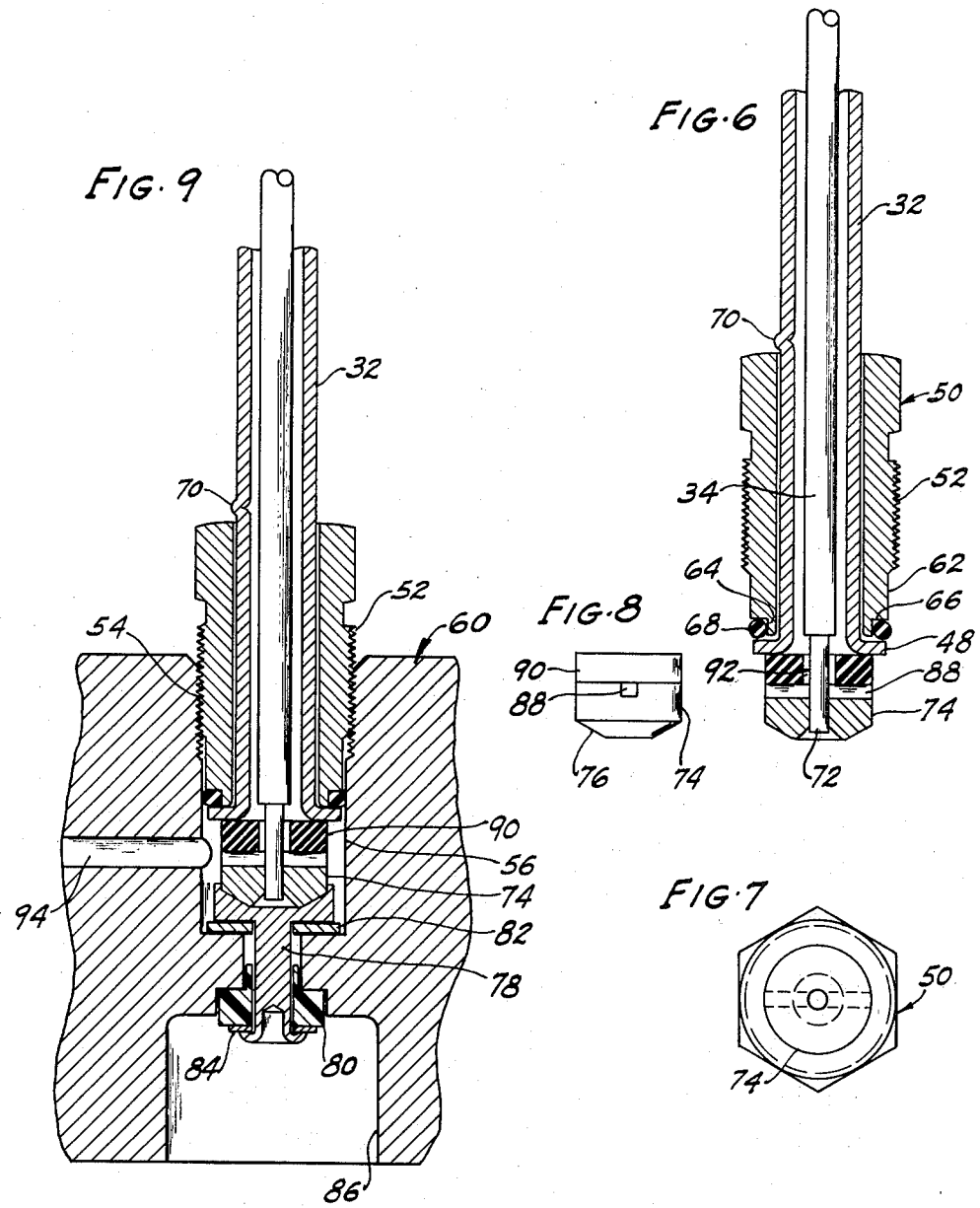

3,814,634
COMBINED PILOT BURNER AND
THERMOCOUPLE DEVICE
Richard A. Burket, Thomas P. Fleer, and Carl A. Smith, St. Louis County, and John J. Love, St. Louis, Mo., assignors to Emerson Electric Co., St. Louis, Mo.
Filed Sept. 11, 1972, Ser. No. 287,609
Int. Cl. H01v 1/02
U.S. Cl. 136—218
9 Claims

ABSTRACT OF THE DISCLOSURE

A combined pilot burner and thermocouple unit comprising a chrome-steel tube element and a shorter nickel-copper rod element arranged coaxially therein and welded together at their outer ends to form a hot junction. The inner ends of the thermocouple tube and rod elements are suitably joined, respectively, end-to-end with a conductive metal tube and a coaxial conductive wire coextending with the tube to a remote gas control valve and to an electromagnet housed therein as gas supply conduit means and as electrical conduction means. A larger diameter burner tube surrounding and coextending with the chrome-steel tube element has a burner port at its outer end adjacent the hot thermocouple junction and is closed at its inner end around the chrome-steel tube element. An aperture in the wall of the chrome-steel tube element near its inner end permits the flow of gas from the conductive metal tube to the burner tube, and a fluid-tight seal in the chrome-steel tube element between the aperture and inner end of the shorter nickel-copper rod element excludes gas from that portion of the tube within which this element extends. Connector means at the remote ends of the conductive tube and wire provide a fluid-tight connection of the tube with a gas passage in the gas body and electrical connection with an electromagnet house therein.

---

This invention relates generally to thermcouple heated by a gas pilot burner flame which generate electrical energy to hold open a biased closed, safty cut-off valve only so long as pilot flame exists. More particularly, the invention relates to a unitary structure combining a pilot burner, a closely associated thermocouple, and means for conducting electrical energy from the thermocouple to an electromagnet house in a gas control valve and for conducting gas from the control valve to the pilot burner.

It is well understood in the art that it is essential to the continued reliable operation of this primary safety device that any nickel-containing thermocouple element employed in this service be effectively isolated from fuel gas, burner flame, and the products of combustion to preclude the formation of carbon deposits thereon.

It is also known to be advantageous from the standpoint of simplicity, compactness, economy of construction, and the consumption of gas to provide a unitary construction in which a pilot burner tube extends coaxially with the thermocouple elements and provides a flame impinging directly upon a hot thermocouple junction. Further, in connection with such arrangement, it is also known to be advantageous to provide means in the form of a conductive metal tube and coextending conductor wire therein connected to and extending in axial alignment with the thermocouple elements to a remote point for the joint conduction of gas and electrical energy between the burner tube and thermocouple and a remote point.

U.S. Pat. 2,833,843 disloses a coaxial arrangement of pilot burner tube and thermocouple elements with the pilot flame impinging directly upon the hot thermocouple junction and with a nickel-containing thermocouple element disposed within a nickel-free tubular element and isolated from gas and ambient products of its combustion. In this arrangement, however, gas is supplied to the burner tube through a fuel conduit disposed laterally from the pilot burner tube and from the tubular thermocouple element and electrical leads, and includes a rigid support member connecting the fuel conduit with the burner tube and thermocouple elements and having a fuel passage therein bypassing the tubular thermocouple element.

U.S. Pat. 2,267,742 discloses, in FIGS. 11 and 14, a coaxial arangement of tubular thermocouple elements, the internal one of which serves as a pilot burner tube and includes coaxially arranged gas and electrical conductor tubes in axial alignment with the thermocouple elements. In these arrangements, however, the pilot flame does not impinge directly upon the thermocouple junction and neither of the thermocouple elements is isolated from fuel gas and products of combustion incident to pilot burner and adjacent main burner operation. It is, moreover, not disclosed which, if either, of the thermocouple elements contains nickel.

An object of this invention is to provide a generally new and improved unitary construction having coaxial, coextending thermocouple elements and pilot burner tube with coaxial, coextending gas and electrical conductor elements directly connected thereto and in axial alignment therewith, in which pilot flame impinges directly upon the hot thermocouple junction and in which one of the thermocouple elements contains nickel and is completely isolated from gas and the products of its combustion.

A further object is to provide novel connector means at the remote ends of the gas and electrical conductor elements for connection with a gas passageway and an electromagnet in the body of a gas control valve.

Further objects and advantages will appear from the following description when read in connection with the accompanying drawings.

In the drawings;

FIG. 1 is a side elevational view of a combined thermocouple and pilot burner device, constructed in accordance with the present invention, including gas and electrical conductor means leading to the body of a gas control valve, shown fragmentarily;

FIG. 2 is an enlarged plan view of the device shown in FIG. 1;

FIG. 3 is a longitudinal, cross-sectional view of the pilot burner and thermocouple elements taken along lines 3—3 of FIG. 2;

FIG. 4 is an enlarged, partially sectionalized view of the pilot burner and thermocouple elements with the outer ends of the thermocouple and flame deflector shown in cross-section as they appear prior to welding.

FIG. 5 is a cross-sectional view taken along line 5—5 of FIG. 3 showing the burner port at the end of the pilot burner tube;

FIG. 6 is a longitudinal, cross-sectional view taken along line 6—6 of FIG. 1 through a remote end portion of the gas and electric conductor elements, showing the connector means;

FIG. 7 is a bottom plan view of the remote end of the gas and electrical conductor elements;

FIG. 8 is an elevational view of the electrical contacting element and insulator disc showing the transverse gas passageway; and FIG. 9 is a longitudinal, cross-sectional view taken along line 6—6 of FIG. 1, showing the connector means at the end of the gas and electrical conductor elements assembled in the body of a gas control valve.

Referring to the drawings in more detail, the combined thermocouple and pilot burner comprises an inner metal thermocouple rod element 10, containing nickel, coaxially arranged within and coextending with an outer nickel-free metal thermocouple tube element 12. The inner rod element 10 is smaller in diameter than the inside of the tube element 12, except at its outer end where it is enlarged at 14 to fit the walls of tube element 12. The enlarged end 14 of the nickel-containing rod element 10 is spaced inward from the outer end of tube element 12 prior to welding, as shown in FIG. 4, and there is a washer-like flame deflector element 16 fitted on the end of tube element 12. The inward spacing of the enlarged portion 14 of element 10 from the end of tube element 12 and the position of flame deflector element 16 thereon are such that when the ends of rod element 10, tube element 12, and deflector element 16 are welded together, as shown in FIG. 3, to form a hot thermocouple junction, the enlarged end of inner element 10 is covered by a substantial mass of the nickel-free metal of tube element 12 and the deflector element 16 is securely welded thereto.

The tube element 12 extends beyond the inner end of rod element 10 and is enlarged by swaging to form three steps of enlargement at 18, at 20, and at 22. A pilot burner tube 24 surrounds and coextends coaxially with the thermocouple tube element 12. The inner end of burner tube 24 fits over the enlarged end portion 22 of the tube element 12 and is fixed thereto at this point by any suitable means, such as brazing. The outer end of burner tube 24 is formed inward at 26 to form an open end freely fitting around the thermocouple tube element 12 at a point spaced slightly inward from the hot junction and flame deflector element 16. A notch 28 in the formed end portion 26 of the burner tube provides a burner port, see FIG. 5. A screw-threaded mounting stud 30 is welded to the outer surface of burner tube 24 near its inner end.

Fitted into the enlarged end portion 22 of burner tube 24 is a metal gas conductor tube 32 which is fixed in the burner tube by any suitable means, such as brazing, to provide a rigid mechanical connection and to form a cold thermocouple junction. Within the gas conductor tube 32 is an insulated electrical conductor wire having an insulated portion 36 extending into the enlarged end portions 18, 20, and 22 of tubular thermocouple element 12 and an uninsulated portion 38 extending through a portion of the first enlarged step 18. The uninsulated or bare portion 38 of electrical conductor wire 34 extends into the thermocouple tube element 12 beyond its enlarged end portion 18 and abuts the end of the inner nickel-containing thermocouple rod element 10. The end of conductor wire 34 is connected to the inner end of the thermocouple rod element 10 in any suitable manner at 40 to form a cold junction and a rigid mechanical connection. There is an insulator sleeve 41 fitted over the rod 10 and conductor wire 34.

There is an internal shoulder 42 formed at the first enlargement 18 of the thermocouple tube element 12, and there is a rubber-like O-ring 44 tightly fitted on the bare or uninsulated portion of wire 34 and tightly fitted into the enlarged portion 18 of the thermocouple tube element 12. The shoulder 42 positions the O-ring 44 upon assembly. There is provided thereby a fluid-tight seal between the enlarged inner end portion of tube element 12 and the remainder of the tube through which thermocouple rod element 10 extends. An aperture 46 in the wall of the enlarged end portion 20 of the thermocouple tube element 12 provides comunication between gas conductor tube 32 and the burner tube 24 via the enlarged end portion 20 of the thermocouple tube element 12.

The pilot burner is of the non-aerated type; that is to say, no air is mixed with the gas prior to its emergence from a port 28 at the upper end of the burner tube 24, see FIG. 5. The gas issuing from port 28 is dispersed by the deflector 16, whereby it mixes with air and, when ignited, burns around the adjacent surface of the deflector 16 and thermocouple tube element 12 at the point thereon at which it is joined with the inner thermocouple element to form a hot junction. Depending upon the position in which the device is mounted in use, there may be one or more ports 28 at the end of the burner tube and their arrangement and size may be made such as to provide the best flame pattern for heating the thermocouple junction and igniting an adjacent main burner. It will be understood that the ports at the end of the burner tube 24 do not meter the gas in this type of burner, the gas flow being metered at a remote point by an accurately sized orifice (not shown) which is conventionally positioned in the body of a gas control valve to which the device is connected.

Referring to FIGS. 6 and 9, the remote end of the gas conductor tube 32 is flared to form a flange 48, and there is an elongated, hollow, hex-headed connector nut 50 loosely fitted over the end of tube 32 and retained by the flange 48. The nut 50 has a screw-threaded portion 52 adapted to threadedly engage the outer screw-threaded portion 54 of a counterbore 56 in the body of a gas control valve, shown fragmentarily at 60 in FIG. 9. The nut 50 is further provided with a short, reduced diameter end portion 64, thereby providing a shoulder at 66. There is a rubber-like O-ring 68 fitted in a slightly stretched position over the short reduced end portion 64 and retained between the flange 48 of the tube 32 and the shoulder 66 on nut 50. The cross-sectional diameter of the O-ring is slightly greater than the length of the short reduced end portion 64. The diameter of the reduced end portion 64 and that of the O-ring 68 is such that the outside diameter of the O-ring is not greater, and preferably just slightly less, than the inside diameter of the screw-threaded portion 54 of the counterbore 56 so that the O-ring may be entered without interference with these threads.

The gas conductor tube is provided with a small extrusion 70 so spaced from its end flange 48 as to permit slight longitudinal movement of nut 50 thereon while yet restricting such movement so as to retain O-ring 68 on portion 64. The insulated coaxial electrical conductor wire 34 has a bared portion 72 projecting from the remote end of tube 32. Portion 72 passes through a hole in a washer-like conductive contacting element 74 and is fixed therein, as by soldering. The contacting element 74 is preferably provided with a lower beveled face 76 adapted to engage a complimentary recess in the face of a terminal 78 fixed by riveting in the body of a gas control valve. Terminal 78 is electrically insulated from the metal valve body by insulators 80 and 82 and is provided with a terminal clip 84 for connection to the winding of an electromagnet (not shown) housed in the body cavity 86. Insulators 80 and 82 also provide a gas-tight seal.

The upper surface of contacting element 74 is provided with a groove 88, and there is a thick insulator washer 90 between the contacting element 74 and the conductor tube flange 48. The insulator 90 has a central perforation 92 larger in diameter than the bared conductor wire passing therethrough, and this perforation 92, together with groove 88 in contacting element 74, provides communication between the counterbore 56 in the valve body and the gas conductor tube 32. Gas is supplied to the counterbore through a passage 94 in the valve body.

When connecting the device to a valve body, the nut 50 is entered into the screw-threaded counterbore 56 and tightened. This causes flange 48 to engage insulator 90 and compresses the rubber-like O-ring 68 axially between the flange 48 and the shoulder 66, whereupon the cross-sectional configuration of the O-ring becomes oval and forms a fluid-tight seal between the smooth wall portion of counterbore 56 and the reduced diameter portion 64 of nut 50 as well as between the flange 48 and shoulder 66. Connection of the burner tube to suitable support means adjacent a main burner is accomplished by merely passing the screw-threaded mounting stud through a hole in such support means and applying a nut.

Modifications of the described embodiment, which lie within the spirit of this invention, will occur to those skilled in the art. For example, other means than the mounting stud 30 for connecting the burner tube to suitable support means may be employed, such as the economical provision of a perforated mounting flange formed at the lower end of the burner tube 24.

We claim:

1. A unitary structure combining in coaxial arrangement a pilot burner tube, a thermocouple, and gas and electrical conductor means in which one of the thermocouple elements containing nickel is isolated from fuel gas and the products of combustion; comprising a nickel-alloy thermocouple rod element, a longer nickel-free tubular thermocouple element surrounding said rod element in coaxial and radial spaced relationship and projecting from both ends thereof, said rod and tube being welded together at their outer ends to provide a hot junction with the end of said tubular element formed to provide a complete closure overlying the end of said rod element, a gas and electrical conductor tube connected at one end to the inner end of said tubular thermocouple element in axial alignment therewith to form a first cold junction, an electrical conductor element coextending in radial spaced relationship in said conductor tube and having one end extending beyond said one end of said conductor tube and into said tubular thermocouple element and being connected to the inner end of said thermocouple rod element to form a second cold junction, a coaxial burner tube surrounding said thermocouple tube element in radial spaced relationship, said burner tube being closed at its inner end against the wall of said thermocouple tube element near its inner end and said burner tube terminating at its outer end in a flame port spaced inwardly from but adjacent said hot junction, an aperture in the wall of said thermocouple tube near its inner end providing communication between said conductor tube and said surrounding burner tube, means forming a fluid-tight seal between said electrical conductor element and the wall of said tubular thermocouple element at a point between said aperture and the inner end of said thermocouple rod element, a flame deflector at the outer end of said thermocouple elements, and said conductor tube and conductor element coextending from their thermocouple connected ends to remote ends for connection with a source of gas and with a device utilizing electrical energy generated at said thermocouple.

2. The device claimed in claim 1 in which said tubular thermocouple element has an enlarged inner end portion providing an internal shoulder therein at a point between said aperture and the inner end of said thermocouple rod element, and said means forming a fluid-tight seal comprises a rubber-like O-ring surrounding said electrical conductor, and compressed between said conductor and the wall of said enlarged end portion, and bearing against said shoulder whereby it is positioned in assembly.

3. The device claimed in claim 1 in which the wall at the outer end of said burner tube is formed inward to provide at least a partial closure around the tubular thermocouple element and in which said inwardly formed wall is notched to provide a flame port.

4. The device claimed in claim 1 which includes an insulating sleeve surrounding said thermocouple rod element and said electrical conductor element at the point of their connection.

5. The device claimed in claim 1 which includes mounting means at the inner end of said burner tube.

6. The device claimed in claim 1 in which said flame deflector means comprises a washer-like element fitted over the outer end of said tubular thermocouple element and welded thereto.

7. The device claimed in claim 5 in which said mounting means comprises a screw-threaded stud welded at one end to the outer wall surface of said burner tube near its inner end.

8. A unitary structure combining in coaxial arrangement a pilot burner, a thermocouple and gas and electrical conductor means comprising; a nickel-alloy rod element, a tubular thermocouple element of nickel-free alloy surrounding said rod element in radially spaced relationship and projecting at one end beyond one end of said rod element, said rod element having a short enlarged diameter portion at said one end fitting said tubular element and said projecting end portion of said tubular element being welded to said enlarged end of said rod element to provide a hot junction and being formed to provide a relatively thick complete end closure thereof overlying said one end of said rod element, the other end of said tubular thermocouple element being open, a gas and electrical conductor tube connected at one end to the open end of said tubular thermocouple element in axial alignment therewith to form a first cold junction, an electrical conductor element connected at one end to the other end of said thermocouple rod element to form a second cold junction, and said electrical conductor element coextending with said conductor tube and in radial spaced relationship within said conductor tube to remote adjacent ends for connection with a source of gas and with a device utilizing electrical energy generated at said thermocouple, a metal burner tube surrounding and coextending with said tubular thermocouple element in radially spaced coaxial relationship, one end of said burner tube being spaced inward from but adjacent said welded ends of said thermocouple elements and being formed to provide a flame port, the other end of said burner tube being closed against the wall of said tubular thermocouple element at its open end, an aperture in the wall of said tubular thermocouple element near its open end providing communication between said tubular thermocouple element and the annular space therearound defined by said burner tube, and means providing a fluid-tight seal in said tubular thermocouple element between said aperture and said hot junction and adjacent said aperture whereby fuel gas may be supplied to said burner tube through the open end of said tubular thermocouple element while excluding it from the major portion of the interior of the element.

9. The device claimed in claim 8 further including connector means at the remote ends of said gas and electrical conductor tube and said coaxial eelctrical conductor element comprising; a hollow externally screw-threaded fitting freely fitted on the remote end of said tube, an outwardly directed flange formed on the remote end of said tube, said fitting having a short reduced diameter end portion adjacent said flange and a shoulder facing said flange, a rubber-like annulus fitted on said short reduced diameter portion adapted to be compressed when said fitting is forced into contact with said flange and to be expanded radially to provide radial sealing means between said reduced diameter portion of said fitting and the wall of a screw threaded passage into which said fitting is screwed and to provide sealing means between said flange and said shoulder, said remote end of said electrical conductor element projecting from the flanged end of said conductor tube and having a contacting element fixed thereon, an insulator element surrounding said electrical lead between said contacting element and said flange, and fluid passage means extending through said insulator and contacting elements.

References Cited

UNITED STATES PATENTS

| | | | |
|---|---|---|---|
| 2,833,843 | 5/1958 | Jackson et al. | 136—219 |
| 3,556,864 | 1/1971 | Wagner | 136—228 |
| 2,710,055 | 6/1955 | Betz | 136—219 X |
| 2,335,471 | 11/1943 | Ashcraft | 136—218 |
| 2,892,879 | 6/1959 | Fritts et al. | 136—228 |
| 2,821,564 | 1/1958 | De Leon | 136—228 X |
| 3,619,299 | 11/1971 | Weirmann et al. | 136—228 |

CARL D. QUARFORTH, Primary Examiner

E. A. MILLER, Assistant Examiner

U.S. Cl. X.R.

136—219, 222, 228, 235